Jan. 5, 1932.  F. X. GRASER  1,840,161

POWER TRANSMISSION DEVICE

Filed May 1, 1929  2 Sheets-Sheet 1

WITNESSES
Edw. Thorpe
Hugh H. Ott

INVENTOR
Frank X. Graser
BY
ATTORNEYS

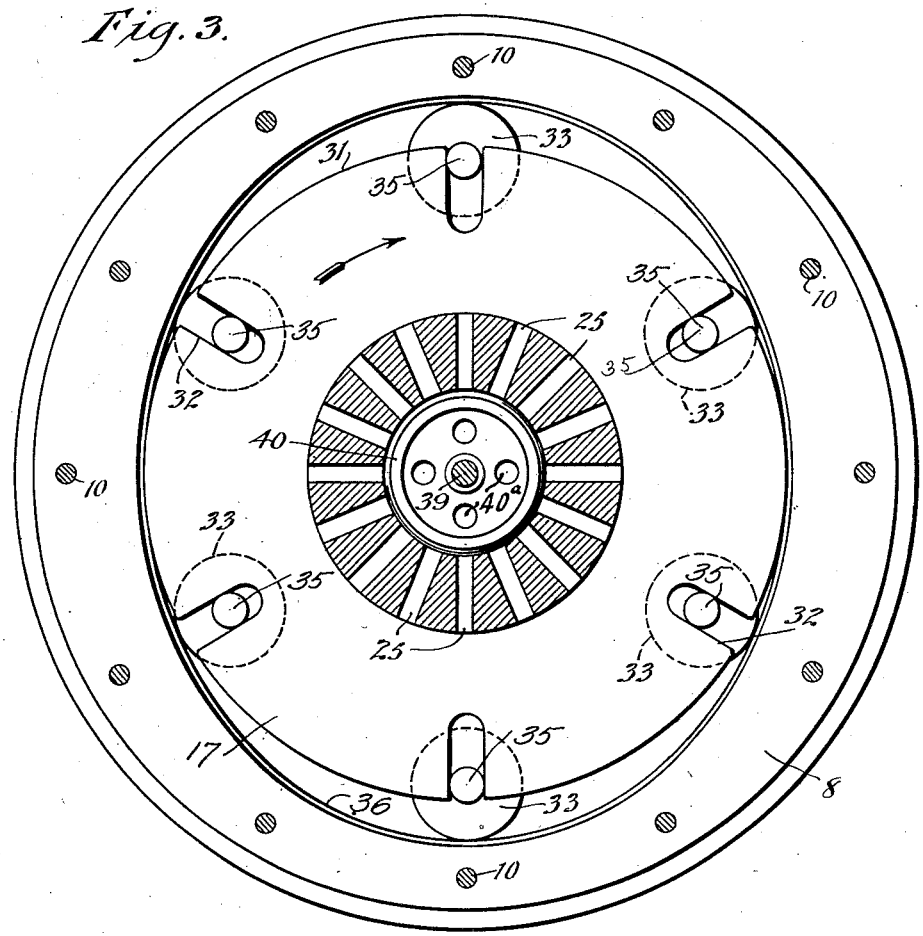
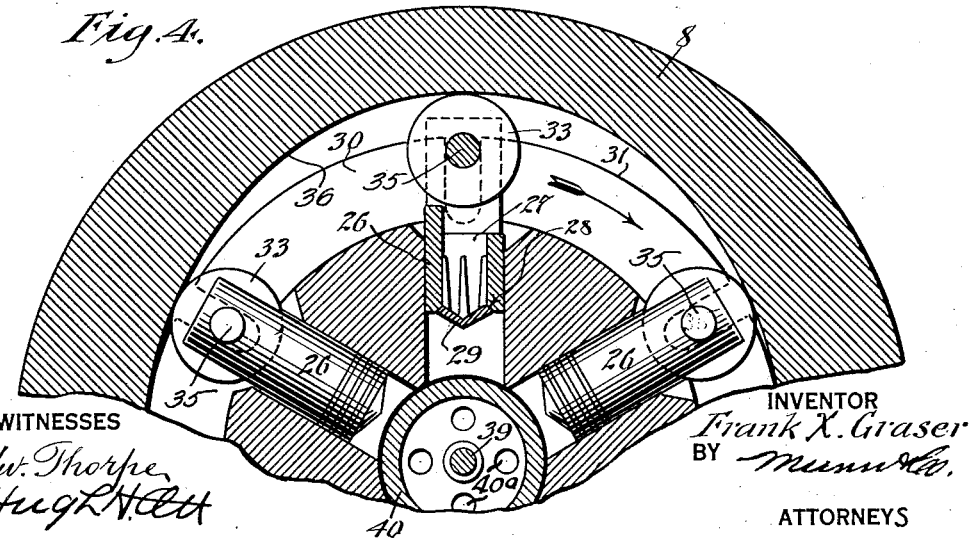

Patented Jan. 5, 1932

1,840,161

UNITED STATES PATENT OFFICE

FRANK X. GRASER, OF LINDENHURST, NEW YORK

POWER TRANSMISSION DEVICE

Application filed May 1, 1929. Serial No. 359,646.

This invention relates generally to power transmitting devices, and refers more particularly to devices of this nature which are controlled by hydraulic pressure.

Broadly, the invention comprehends a hydraulic power transmission wherein the driven element thereof may be caused to move at varying relative rates of speed with respect to the driving element, from a stationary or inactive position up to a speed substantially the same as the driving element, by controlling the circulation of a liquid which fills the device.

More specifically, the invention contemplates in a device of the character set forth, driving and driven members consisting of inner and outer concentrically mounted rotors defining a fluid tight enclosure filled with a liquid, the inner rotor having liquid passages and elements constituting a common means for circulating the fluid upon relative rotation of the rotors and for establishing a driving connection between the members when the liquid circulation is retarded or prevented.

The invention further aims to provide an improved device which may operate in the capacity of a clutch or a combined clutch and power transmission of the variable speed type, which device in the latter instance eliminates the employment of change speed gearing.

As a still further object, the invention embodies in a device of the character set forth, mechanism for effecting a gradual and practically imperceptible coupling of the driving and driven elements and change in their speed ratio.

Other objects of the invention reside in the comparative simplicity of construction of the device, the economy with which it may be produced and installed and the general efficiency derived therefrom.

With the above recited and other objects in view, reference is had to the following description and accompanying drawings, in which there is exhibited one example or embodiment of the invention, while the claims define the actual scope of the same.

In the drawings:

Figure 3 is a transverse sectional view taken approximately on the line indicated at 3—3 in Figure 1.

Figure 4 is a fragmentary transverse sectional view taken approximately on the line indicated at 4—4 in Figure 1.

Figure 1:
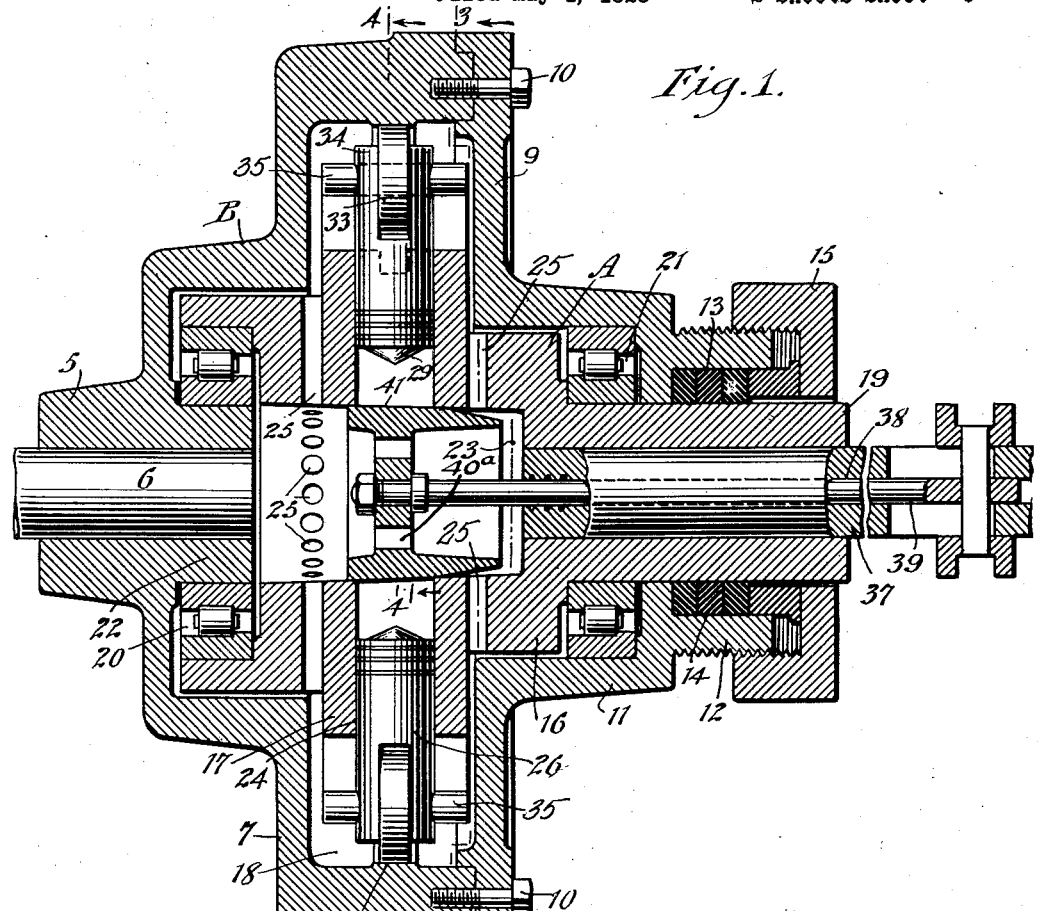
Figure 1 is a longitudinal sectional view through the device illustrating the parts in the position to fully couple the driving and driven members.

Referring to the drawings by characters of reference, the device includes a driving member which is indicated generally by the reference character A and a driven member designated generally by the reference character B, the latter being in the nature of a casing or enclosure for the former. The driven member includes a concentric hub 5 which receives a driven shaft 6 keyed or otherwise secured to the hub for turning movement therewith. The hub in turn is formed with a peripheral flange 7 provided with an axially extending annular wall 8 at its marginal edge. The driven member B further includes a cover plate 9 which is bolted or otherwise secured by fastening elements 10 to the free end of the annular wall 8. The cover plate is formed with a cylindrical collar 11 having a reduced externally threaded extremity 12, which extremity is provided with an internal recess 13 adapted to receive the packing rings 14. A packing nut 15 is designed to threadedly engage over the externally threaded extremity 12 to provide a suitable packing gland or stuffing box.

Figure 2:
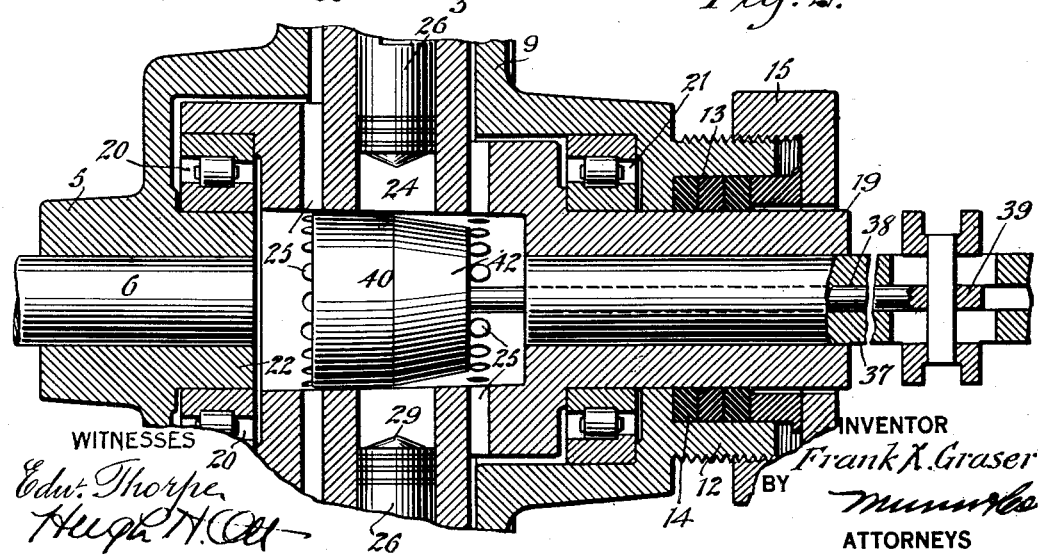
Figure 2 is a similar fragmentary view illustrating the arrangement of parts when the driven member is coupled for driving at a relatively lower rate of speed than the driving element.

The driving member A includes a substantially cylindrical rotor 16 having an enlarged medial portion 17 conforming generally to the annular chamber 18 which is defined by the flange 7, annular wall 8 and the cover plate 9. The rotor 16 is completely housed by the driven member B except for the tubular stem portion 19 which extends through the hub 11 and reduced extremity 12 in an opposite direction from the shaft 6 but in axial alignment therewith. The inner cylindrical rotor 16 is mounted on bearings 20 and 21 carried by the inwardly projecting portion 22 of the hub 5 and the inner periphery of the hub portion 11 of the cover plate. Obviously, the packing rings 14 of the packing gland or stuffing box function to produce a fluid tight joint where the stem 19 protrudes through the driven member B. The rotor 16 is provided with an axial bore 23, which bore terminates at one end adjacent the stem 19 and which bore extends through the opposite end of the rotor. Preferably, the bore is of gradually increasing diameter from the former end to the latter end for a purpose which will be hereafter set forth. The inner rotor 16 is provided with radial openings 24 which extend from the axial bore outwardly and completely through the enlarged medial portion 17. The inner rotor 16 is further provided with a plurality of radial passages 25 which extend outwardly from the axial bore through the outer periphery of the rotor beyond the opposite sides of the enlarged medial portion 17. A tubular plunger 26 is mounted in each radial opening 24 for radial reciprocation. The plungers 26 define therethrough passages 27, the inner ends of which passages are flared to provide valve seats 28 with which check valves 29 are adapted to cooperate in a manner which will be hereafter described. The enlarged medial portion 17 of the inner rotor or driving member is provided with a circumferential groove 30 which is of a width corresponding to the thickness of the plunger rollers 33. The groove 30 defines on the portion 17 axially spaced circumferential flanges 31 which are formed with radial inwardly extending guide notches 32 corresponding to the plunger openings. The plungers 26 are bifurcated at their outer ends and rollers 33 are arranged between the furcations 34. Roller shafts 35 extend transversely through the furcations 34 and extend into the guide notches 32. The inner periphery of the annular wall 8 of the driven member or outer rotor B is provided with an elliptical eccentric or cam surface 36 with which the plunger rollers 33 coact upon relative turning movement of the driving and driven members A and B, so as to cause each plunger to be moved radially inward twice during each complete relative turning movement between the members A and B. A drive shaft 37 extends through the tubular stem 19 and is keyed or otherwise secured thereto for turning movement therewith, and said drive shaft is provided with an axially extending opening 38 through which a shift rod 39 extends. The inner end of the shift rod is suitably connected to a sleeve valve 40 which is arranged in the axial bore 23 for sliding movement and having one or more axial ports 40a. The sleeve valve is provided with a frusto-conical or tapered periphery 41 corresponding to the taper of the axial bore 23 and serving when shifted to the position in Figure 1, to wedge tightly in the axial bore 23 so as to close the inner ends of the plunger openings 24. Obviously, when the sleeve valve 40 is shifted to the left in Figure 1 to the position illustrated in Figure 2 or to a further position to the left of said figure, the inner ends of the plunger openings 24 are uncovered. The sleeve valve is provided with an annular axially extending apron 42, the external periphery of which sharply tapers toward its free end at a substantially greater angle than the walls of the axial bore 23 for a purpose which will be hereafter brought out.

In practice, the device will be completely filled with oil or an equivalent liquid and in operation, assuming the sleeve valve 40 to be completely shifted to the left so that the inner ends of the plunger openings 24 are completely unobstructed by said valve, the driving element turning in the clockwise direction indicated by the arrows in Figures 3 and 4 will result in a free turning movement of the driving member with the driven member B at rest. During this turning movement of the driving motor or inner rotor A, the plungers are caused to move outwardly by centrifugal force to maintain their rollers 33 in contact with the eccentric or cam surface 36. It is apparent that the plunger rollers 33 coacting with said eccentric or cam surface 36 will cause the plungers to be moved radially inward as they coact with the lower portions of the eccentric surface. Obviously, inward movement of the plungers will force the oil or fluid trapped in advance of the inner ends of the plungers by the check valves 29 through the inner ends of the plunger openings and into the axial bore 23. The oil or liquid in the bore 23 will be forced outwardly therefrom through the radial passages 25 into the annular chamber 18. As the plungers 26 move outwardly upon reaching the wider portions of the eccentric surface 36, the check valves 29 will open to prevent any back pressure. Under this arrangement, it is clearly apparent that with the sleeve valve 40 in the position mentioned, the driving member A will freely rotate with the driven member B at rest while the liquid or oil freely circulates radially inward through the plunger openings 24. When the device is to function only in the nature of a clutch, the sleeve valve 40 is shifted to the right to the position illustrated in Figure 1. Obviously, in this position, said valve completely closes and obstructs the inward flow of the liquid through the plunger openings and due to the fact that the plungers cannot be cammed inwardly by the eccentric surface 36, the plungers and their rollers 33 jam against the eccentric surface 36 and turn the driven member therewith.

Where the device is to function in the nature of a combined clutch and variable speed power transmission, the sleeve valve 40 is shifted from its extreme starting position at the left, toward the right the desired distance to partially obstruct or retard the flow of the liquid axially inward through the plunger openings 24. This permits a retarded relative movement of the driven member B by and with the driving member A so that practically any relative driving speed of the driven member with respect to the driving member may be obtained from a stationary inactive position of the driven member up to approximately the same speed as the driving member. The apron 42 of the sleeve valve 40 functions to cause a gradual and practically imperceptible pick-up of the driven member B as well as a gradual and imperceptible release of the driven member B.

For high speed lighter duty machines, the eccentric will have a lesser difference between the high and low portions than when the device is used for slow heavy duty machines and, obviously, within the scope of the invention, more than one row of pistons may be employed or the number of pistons may be otherwise increased. Due to the fact that the device is filled with oil, it is apparent that the bearings and moving parts thereof are constantly lubricated and consequently, wear on the parts will be practically eliminated.

What is claimed is:

1. In a hydraulic clutch, an outer hollow cylindrical liquid filled member, an inner rotary member arranged within the outer member and having two sets of radial liquid passages, one set of passages communicating with the other set of passages, and coacting devices constituting a common means operable by relative rotation of the members for pumping the liquid radially inward through one set of passages and causing the liquid to flow radially outward through the other set of passages and serving when the former set of passages are closed to cause movement of one member by and with the other member.

2. In a hydraulic clutch, an outer hollow cylindrical liquid filled member, an inner rotary member arranged within the outer member and having two sets of radial liquid passages, one set of passages communicating with the other set of passages, and coacting devices constituting a common means operable by relative rotation of the members for pumping the liquid radially inward through one set of passages and causing the liquid to flow radially outward through the other set of passages and serving when the former set of passages are closed to cause movement of one member by and with the other member and means for cutting off the flow of liquid through said passages.

3. In a combined clutch and variable speed power transmission, a hollow cylindrical liquid filled member, a rotary member arranged within the first member and having two sets of radial liquid passages, one set of passages communicating with the other set of passages, and coacting devices constituting means operable by relative rotation of the members for pumping the liquid radially inward through one set of passages and radially outward through the other set of passages and serving when said one set of passages is closed or partially closed to cause movement of one member by and with the other member at relative or at the same rate of speed.

4. In a combined clutch and variable speed power transmission, a hollow cylindrical liquid filled member, a rotary member arranged within the first member and having two sets of radial liquid passages, one set of passages communicating with the other set of passages, and coacting devices constituting means operable by relative rotation of the members for pumping the liquid radially inward through one set of passages and radially outward through the other set of passages and serving when said one set of passages is closed or partially closed to cause movement of one member by and with the other member at relative or at the same rate of speed and means for cutting off or retarding the flow of liquid through said passages as and for the purpose specified.

5. In a clutch, a hollow liquid filled member, a second member enclosed thereby having a portion extending axially therefrom, said members constituting the driving and driven elements of the clutch, the second member having two independent sets of radial liquid passages, one set of passages communicating with the other set of passages, means operable by relative rotation of the members for pumping the liquid in one direction through one set of passages and in the opposite direction through the other set of passages and means for obstructing the passage of liquid through the first set of passages for causing one element to turn with the other element.

6. In a clutch, an outer hollow rotor, an inner rotor disposed in the outer rotor and having a central bore and openings and passages extending radially therefrom, plungers disposed for reciprocating in the radial openings, a valve disposed in the bore for closing or partially closing the passages, the periphery of the valve at one of its ends tapering relatively to the remainder of the periphery of the valve, and coacting devices constituting a common means operable by relative rotation of the members for pumping the liquid radially inward through the passages.

7. In a clutch, an outer hollow rotor, an inner rotor disposed in the outer rotor and having a central bore and openings and passages extending radially therefrom, plungers disposed for reciprocating in the radial openings, and a valve in the bore for closing the openings and having an axial port affording communication between the passages and openings.

8. In a clutch, an outer hollow rotor, an inner rotor disposed in the outer rotor and having a central bore and openings and passages extending radially therefrom, plungers disposed for reciprocating in the radial openings, a valve in the bore for closing or partially closing the openings, the periphery of the valve at one of its ends tapering relatively to the remainder of the periphery, and said valve having an axial port affording communication between the passages and the openings.

FRANK X. GRASER.